(12) United States Patent
Ruf

(10) Patent No.: US 10,211,973 B2
(45) Date of Patent: Feb. 19, 2019

(54) METHOD AND DEVICE FOR TRANSMITTING DATA ON ASYNCHRONOUS PATHS BETWEEN DOMAINS WITH DIFFERENT CLOCK FREQUENCIES

(71) Applicant: NORTHROP GRUMMAN LITEF GMBH, Freiburg (DE)

(72) Inventor: Markus Ruf, Waldkirch (DE)

(73) Assignee: NORTHROP GRUMMAN LITEF GmbH (DE)

( * ) Notice: Subject to any disclaimer, the term of this patent is extended or adjusted under 35 U.S.C. 154(b) by 0 days.

(21) Appl. No.: 15/101,999

(22) PCT Filed: Dec. 3, 2014

(86) PCT No.: PCT/EP2014/003229
§ 371 (c)(1),
(2) Date: Jun. 6, 2016

(87) PCT Pub. No.: WO2015/086131
PCT Pub. Date: Jun. 18, 2015

(65) Prior Publication Data
US 2016/0308667 A1 Oct. 20, 2016

(30) Foreign Application Priority Data
Dec. 12, 2013 (DE) ........................ 10 2013 020 954

(51) Int. Cl.
*H04L 7/00* (2006.01)
*H04L 7/02* (2006.01)
*H04L 25/05* (2006.01)

(52) U.S. Cl.
CPC ................ *H04L 7/02* (2013.01); *H04L 7/005* (2013.01); *H04L 25/05* (2013.01)

(58) Field of Classification Search
CPC ... H04L 7/005; H04L 7/02; G06F 5/12; G06F 1/04
See application file for complete search history.

(56) References Cited

U.S. PATENT DOCUMENTS

| 5,131,013 | A | | 7/1992 | Choi | |
|---|---|---|---|---|---|
| 5,206,636 | A | * | 4/1993 | Henry | .................. H04L 25/069 340/7.33 |

(Continued)

FOREIGN PATENT DOCUMENTS

| CA | 2928965 A1 | * | 6/2015 | ............... H04L 7/02 |
|---|---|---|---|---|
| CN | 1906909 A | | 1/2007 | |

(Continued)

OTHER PUBLICATIONS

D. Park et al., "A low-power sync processor with a floating-point timer and universal edge tracer for 3DTV active shutter glasses," Cool Chips XIV, 2011 IEEE, Yokohama, 2011, pp. 1-3.*

(Continued)

*Primary Examiner* — Berhanu Tadese
(74) *Attorney, Agent, or Firm* — Tarolli, Sundheim, Covell & Tummino LLP

(57) ABSTRACT

The invention relates to a method for transmitting data between a first unit which accumulates data that has been generated with a first frequency and a second unit which requests the accumulated data with a second frequency. The method has the steps of requesting a first total increment and a first value, which represents a time increment belonging to the first total increment, from the first unit, said first total increment being the data content of the accumulated data block provided at the request time in the first unit; generating a second total increment from the first total increment using the first value, the second total increment being the data content of a data block adapted to a nominal time increment (Continued)

of the second frequency; and transmitting the second total increment to the second unit.

15 Claims, 7 Drawing Sheets

(56) References Cited

U.S. PATENT DOCUMENTS

| | | | |
|---|---|---|---|
| 5,315,299 A * | 5/1994 | Matsumoto | H03M 5/145 341/53 |
| 5,491,696 A | 2/1996 | Nishimura | |
| 5,903,607 A * | 5/1999 | Tailliet | H04B 3/548 340/12.37 |
| 6,054,927 A * | 4/2000 | Brickell | G01S 17/026 340/552 |
| 6,188,685 B1 * | 2/2001 | Wolf | H04J 3/0623 370/378 |
| 6,298,291 B1 * | 10/2001 | Davis, Jr. | B60H 1/008 180/68.2 |
| 6,577,693 B1 | 6/2003 | Wolf | |
| 6,873,642 B1 * | 3/2005 | Fey | H04L 25/493 375/238 |
| 6,956,788 B1 * | 10/2005 | Nguyen | G06F 5/065 365/189.14 |
| 6,982,995 B2 | 1/2006 | Acimovic | |
| 7,072,415 B2 * | 7/2006 | Zerbe | G11C 7/1051 375/286 |
| 7,151,929 B1 * | 12/2006 | Jenkin | H04B 7/18582 455/430 |
| 7,227,876 B1 * | 6/2007 | Cochran | H04J 3/076 370/229 |
| 7,362,778 B2 | 4/2008 | Wolf | |
| 7,500,132 B1 * | 3/2009 | Pothireddy | G06F 5/06 713/400 |
| 7,873,139 B2 * | 1/2011 | Matsuno | H04W 52/0229 377/19 |
| 7,957,455 B2 * | 6/2011 | Paul | H04L 7/0029 375/148 |
| 8,035,746 B2 * | 10/2011 | Cai | H04N 9/896 348/572 |
| 8,598,910 B1 * | 12/2013 | Leshchuk | G06F 1/08 326/112 |
| 8,713,221 B1 * | 4/2014 | Agrawal | G06F 5/12 710/57 |
| 8,832,474 B2 * | 9/2014 | Noller | H04L 12/40039 713/310 |
| 8,842,026 B2 * | 9/2014 | Levy | H03M 1/1057 341/118 |
| 9,172,565 B2 * | 10/2015 | Cadugan | H04L 7/042 |
| 9,374,174 B1 * | 6/2016 | Hammerschmidt | H04L 25/0278 |
| 2003/0123588 A1 * | 7/2003 | Parikh | G06F 5/06 375/354 |
| 2003/0161350 A1 * | 8/2003 | Wolf | H04J 3/076 370/516 |
| 2004/0170196 A1 * | 9/2004 | Susnow | G06F 5/10 370/503 |
| 2004/0255188 A1 * | 12/2004 | Lo | G06F 5/12 714/12 |
| 2005/0220239 A1 * | 10/2005 | Sigurdsson | H04L 7/02 375/372 |
| 2006/0245529 A1 * | 11/2006 | Fischer | G06F 1/12 375/359 |
| 2007/0064852 A1 * | 3/2007 | Jones | G06F 1/04 375/356 |
| 2008/0075125 A1 * | 3/2008 | Subrahmanyan | H04J 3/076 370/506 |
| 2008/0141063 A1 * | 6/2008 | Ridgeway | G06F 5/12 713/501 |
| 2009/0049212 A1 * | 2/2009 | Mangano | H04L 7/02 710/61 |
| 2009/0086874 A1 * | 4/2009 | Wang | H04L 7/033 375/372 |
| 2009/0164827 A1 | 6/2009 | Komninakis et al. | |
| 2012/0051477 A1 * | 3/2012 | Lawange | H04J 3/076 375/371 |
| 2012/0303994 A1 * | 11/2012 | Bauernfeind | H04L 7/005 713/400 |
| 2013/0013950 A1 * | 1/2013 | Maddigan | H04L 7/02 713/400 |
| 2013/0070880 A1 * | 3/2013 | Tell | H04L 7/0012 375/354 |
| 2013/0083611 A1 * | 4/2013 | Ware | G11C 11/4072 365/191 |
| 2013/0251006 A1 * | 9/2013 | Maji | H04L 7/02 375/219 |
| 2014/0093003 A1 * | 4/2014 | Sung | G06F 5/06 375/259 |
| 2015/0249773 A1 * | 9/2015 | Umeno | H04N 5/06 348/512 |
| 2016/0226655 A1 * | 8/2016 | Mu | H04L 7/005 |

FOREIGN PATENT DOCUMENTS

| | | |
|---|---|---|
| CN | 102812434 A | 12/2012 |
| EP | 1 343 261 A1 | 9/2003 |
| EP | 1343261 A1 | 9/2003 |
| JP | 2010144781 A | 7/2010 |
| KR | 1020050036176 A | 4/2005 |
| RU | 2097929 C1 | 11/1997 |
| SU | 1242968 A1 | 7/1986 |
| WO | 20140064781 A1 | 5/2014 |

OTHER PUBLICATIONS

Daejin Park et al "A low-power sync processor with a floating-point timer and universal edge tracer for 3DTV active shutter glasses" Cool Chips XIV, Apr. 20, 2011.

Australian Examination Report for Application No. 2014361266 dated Feb. 8, 2017.

Decision to Grant a Patent for an Invention, and English translation for corresponding Russian Application No. 2016116299/08(025591), dated Oct. 10, 2017.

Notice of Reason for Refusal for corresponding Japanese patent application No. 2016-538753 dated Nov. 2, 2017, with English translation.

Decision to Grant for corresponding Korean application No. 10-2016-7015576 dated Nov. 20, 2017, and English ranslation.

Search Report for corresponding Chinese application No. 201480066378.X., dated May 22, 2018.

* cited by examiner

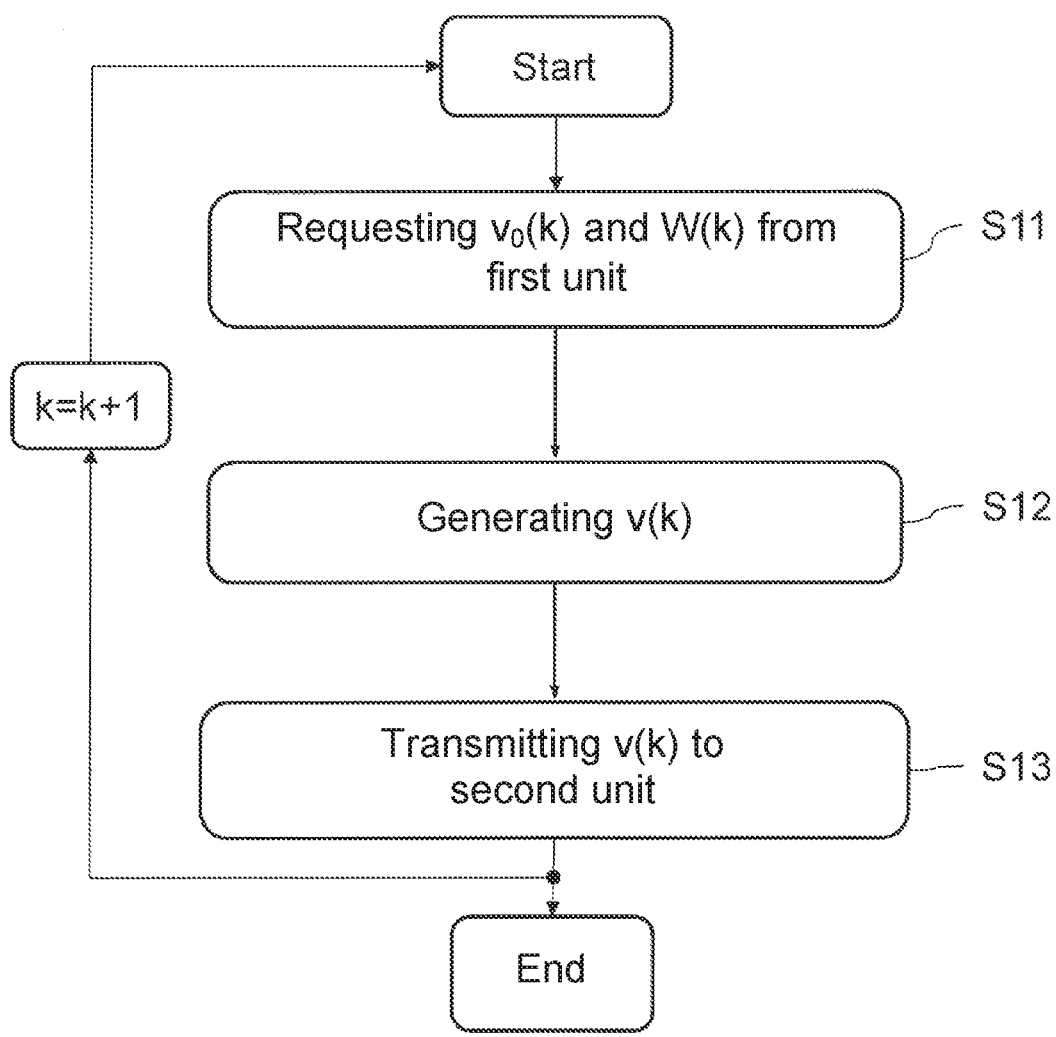

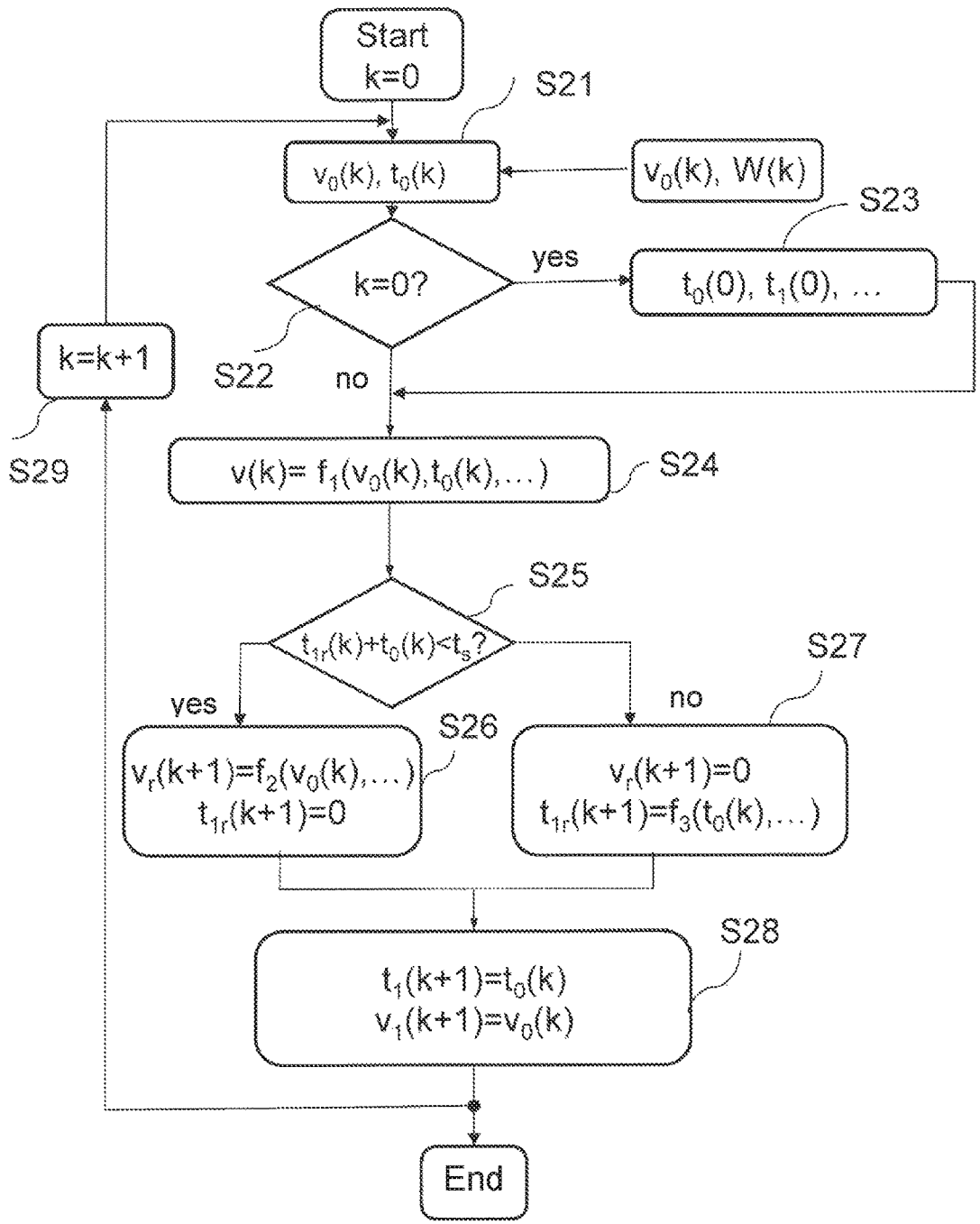

METHOD AND DEVICE FOR TRANSMITTING DATA ON ASYNCHRONOUS PATHS BETWEEN DOMAINS WITH DIFFERENT CLOCK FREQUENCIES

RELATED APPLICATIONS

The present invention is a U.S. National Stage under 35 USC 371 patent application, claiming priority to Ser. No. PCT/EP2014/003229, filed on 3 Dec. 2014; which claims priority from DE 10 2013 020 954.4, filed 12 Dec. 2013, the entirety of both of which are incorporated herein by reference.

Besides of ensuring the transmittal of all data in transmitting of data between two devices or units that operate with different clock frequencies it is also important to synchronize the two clocks.

For example, data can be generated in a first unit with a first clock frequency that are then read out or requested by a second unit with a second clock frequency, which is different from the first clock frequency. In this manner, partial increments are for example generated with a data path clock and temporarily accumulated in sensors. A read out unit reads the present status of the accumulator with a request cycle such that in the respective request cycle a total increment, which is generated in an accumulation interval, is transmitted from the sensor to the read out unit.

The total increment is formed by accumulating over a whole number of data path clocks. If the request cycle is not a multiple of the data path clock by a whole number, this whole number of data path clocks will, however, not be constant. In contrast, the number of data path clocks will change between two whole numbered values N and N+1 such that the obtained mean between the values of N and N+1 corresponds to the ratio of the frequency of the data path clock to the frequency of the request cycle. And even if the request cycle is a whole numbered multiple of the data path clock, already very small deviations of the frequency of the data path clock or of the request cycle can lead to beat effects with respect to the number of data path clocks.

In this manner the so-called integral error criterion that indicates how well the partial increments of the total increments are captured can be satisfied such that after a certain number of request cycles all partial increments that are generated with the data path clock have been transmitted.

However, the change in the number of partial increments included in a read-out total increment will be interpreted in the read-out unit as additional noise. The read-out total increment does not correspond totally to the integration of data over the request cycle. Due to this the so-called differential error criteria that describes this characteristic is satisfied only insufficiently.

Therefore, it is the object of the present invention to provide a method as well as a device for transmitting data on asynchronous paths between two domains with different clock frequencies that satisfy the integral error criterion and improve at the same time also the differential error criterion.

This object is solved by a method and a device according to the independent claims. Preferred embodiments are defined in the dependent claims.

Embodiments of the method and the device according to the invention will be explained as follows on the basis of the figures, wherein similar elements are indicated with the same reference signs.

FIG. 2 shows the method according to the invention in an exemplary form.

FIG. 3 shows a first embodiment of the step of generating the second total increment that comprises either an extrapolation or an interpolation of the presently requested total increment.

Figure 1A:
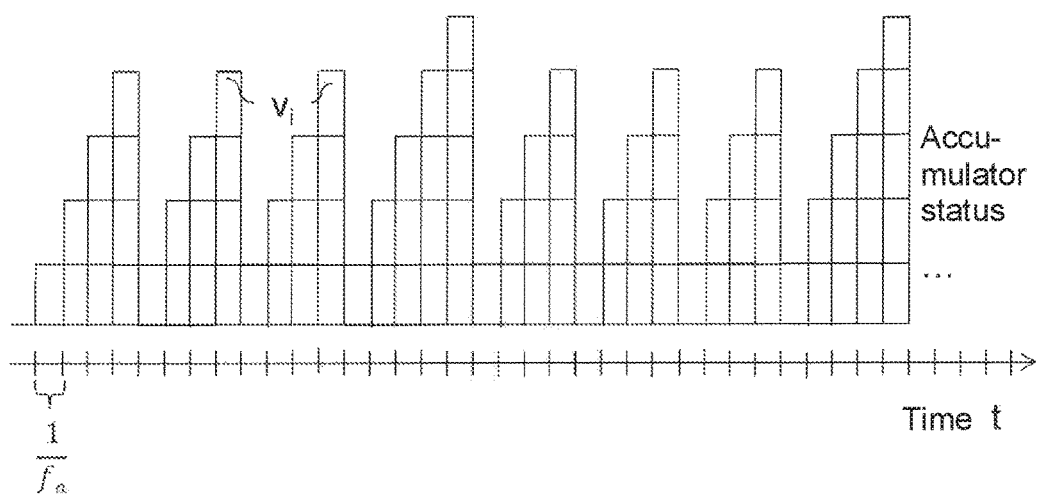
FIG. 1A shows the temporal development of data path clocks as well as the partial increments accumulated in the accumulator.
Figure 1B:
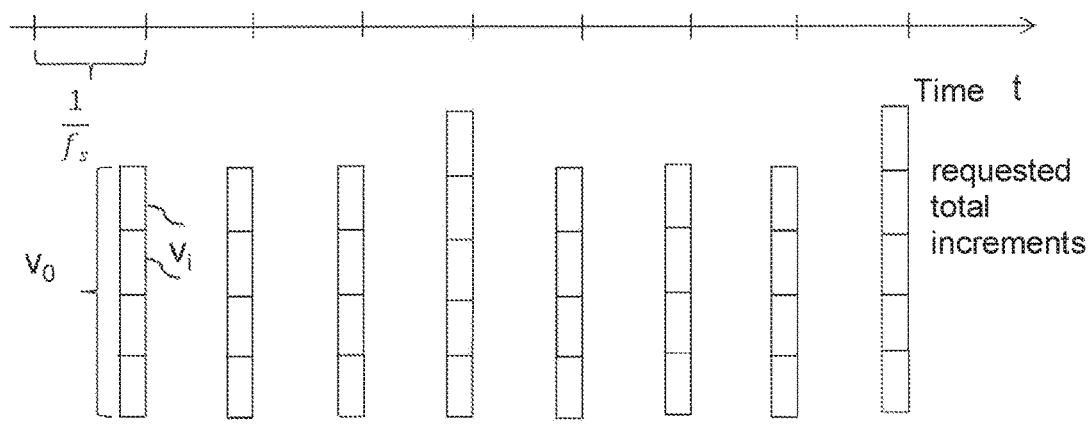
FIG. 1B shows the temporal development of the request cycles as well as the total increment read-out in the respective request cycle.

FIGS. 1A and 1B serve for illustrating the problem underlying the present invention. In FIG. 1A the temporal development of the data path clocks having the first frequency $f_a$ as well as the status of the accumulator belonging to each respective data path clock, i.e. the number of the partial increments $v_i$ accumulated in the accumulator, are illustrated, while in FIG. 1B the temporal development of the request cycles with the second frequency $f_s$ as well as the total increment $v_0$ that is read out or requested in a respective request cycle are illustrated. As an example the first frequency $f_a$ has been set to 3.4 kHZ and the second frequency $f_s$ to 800 Hz. Accordingly, a request cycle consists of $$\overline{N} = \frac{f_a}{f_s} = 4,25$$

data path clocks.

As it is only possible to accumulate over a whole number of data path clocks, it is necessary for complete transmission of all data to accumulate three times over four data path clocks and one time over five data path clocks. This means that the number of the partial increments $v_i$ that are included in a total increment $v_0$ varies between 4 and 5. This pattern is repeated periodically, in the illustrated case the period of this pattern is four request cycles. The sequence of the values 4 and 5 for the number of partial increments $v_i$ included in a total increment $v_0$ adjusts in this process such that the number of changes between the two values becomes maximal.

Possible kinds of errors that can occur in this type of data request and integration are separated into two classes: On the one hand to the integral error criterion that judges how well the partial increments $v_i$ are captured in the total increment $v_0$ and on the other hand to the differential error criterion that judges how well a total increment $v_0$ corresponds to the integration over one request cycle.

In the illustrated example the integral error criterion is satisfied completely, but the differential error criterion is satisfied only insufficiently, which is interpreted in the requesting unit as an additional noise of the data. Hence, by means of the method according to the present invention the differential error criterion shall be improved, while the integral error criterion is still satisfied.

In the explanation of the method according to the present invention the following symbols are introduced:

$t_s$ the nominal time increment belonging to the second frequency $f_s$;

$t_0(k)$ the time increment belonging to the presently requested first total increment;

$t_1(k)$ the time increment belonging to the previous first total increment;

$t_{1r}(k)$ the residual part of the time increment $t_1(k)$ belonging to the previous first total increment that has not been processed in the previous step for generating a second total increment;

$v_0(k)$ the first total increment requested in the present step for requesting a first total increment;

$v_1(k)$ the previous first total increment requested in the previous step for requesting a first total increment;

$v_r(k)$ the extrapolated part used in the previous step for generating a second total increment that has to be taken into account in the present step for generating a second total increment as a correction increment;

$v_2(k)$ the first total increment previous to the previous first total increment requested in the step previous to the previous step for requesting a first total increment;

$t_2(k)$ the time increment belonging to the first total increment previous to the previous first total increment;

$t_{2r}(k)$ the residual part of the time increment $t_2(k)$ belonging to the first total increment previous to the previous first total increment that has not been processed in the previous steps for generating a second total increment;

$v(k)$ the second total increment adapted to the nominal time increment $t_s$.

The expression "increment" is used as a synonym for a difference of data content between an end value and an initial value. For example, the expression "total increment" represents the difference of data content, wherein the initial value of the data content is determined at the beginning of a time interval and the end value of the data content is determined at the end of the time interval. The corresponding time interval is called the time increment belonging to the total increment. Data content may for example be a quantity to be measured.

FIG. 2 shows the method according to the present invention in an exemplary form as a block diagram. After the method has started in a first step S11 a first total increment v0(k) is requested from a first unit together with a first value W(k). In the first unit data that are also indicated as partial increments of a parameter are accumulated with a first frequency $f_a$, which is also called data path frequency. For example, the first unit may be a sensor that captures or generates measurement values with the first frequency $f_a$ and accumulates these continuously in an accumulator. A whole number of accumulated partial increments forms the first total increment $v_0(k)$, wherein the first total increment $v_0(k)$ corresponds to the data content of the data block provided at the present request time k in the first unit, i.e. to the data content of the accumulated partial increments. The accumulation of data allows smoothing of data or measurement values over an accumulation interval.

In addition, the first unit generates the first value W(k), which represents a time increment t0(k) which belongs to the first total increment $v_0(k)$. This first value W(k) may for example be a count of the accumulator that indicates the number of the partial increments contained in the first total increment $v_0(k)$ and from which the time increment $t_0(k)$ belonging to the first total increment $v_0(k)$ can be calculated by multiplication with the data path clock $t_a=1/f_a$. But the first value W(k) may also be the time increment $t_0(k)$ belonging to the first total increment $v_0(k)$. The time increment $t_0(k)$ corresponds to the accumulation interval, wherein the accumulation interval is the time between the point in time of generating the last partial increment which was contained in the previous step for requesting the first total increment, and the point in time of generating the last partial increment requested in the present step for requesting the first total increment. Thus, the accumulation interval is always a whole numbered multiple of the data path clock $t_a$.

After requesting the first total increment $v_0(k)$ the accumulator content of the first unit is set to zero. Further, the first value W(k) is defined for determining the first value W(k+1) in the next request step. For example, the count of the accumulator may be set to zero.

In a second step S12 of the method according to the present invention a second total increment v(k) is generated from the first total increment $v_0(k)$ using the first value W(k), wherein the second total increment corresponds to the data content of a data block adapted to a nominal time increment $t_s$. The nominal time increment $t_s$ corresponds to an integration interval, wherein the integration interval is the time between the point in time of carrying out the previous step of requesting the first total increment and the point in time of carrying out the present step of requesting the first total increment. Thus, the nominal time increment $t_s$ corresponds to a request cycle with $t_s=1/f_s$, wherein $f_s$ is a second frequency that is used by a second unit to request the data accumulated in the first unit. The second frequency $f_s$ and, hence, the nominal time increment $t_s$ are in general predetermined and assumed to be constant. However, it is also possible to determine the concrete value of $t_s$ and to take this value into account in the calculation of the second total increment as present value of $t_s$.

In a third step S13 the generated second total increment v(k) is transmitted to the second unit. The second unit may for example be an evaluation unit or a unit for further processing, which evaluates or further processes the data generated or captured by the first unit and, hence, requests the data from the first unit with the second frequency $f_s$.

As illustrated in FIG. 2, the steps for requesting the first total increment $v_0(k)$ and of the first value W(k), for generating the second total increment v(k) as well as of transmitting the second total increment v(k) can be carried out repeatedly with the second frequency $f_s$, wherein the index k is increased by 1 in each repetition.

The method according to the present invention leads for an arbitrary relation of the first frequency $f_a$ to the second frequency $f_s$ ($f_a/f_s>1$) to an improvement of the differential error criterion, wherein the integral error criterion remains satisfied.

This is in particular also then the case, if the first frequency $f_a$ equals a whole numbered multiple of the second frequency $f_s$.

The method according to the present invention obtains the mentioned advantages also if the normally constant frequency ratio $f_a/f_s$ of first frequency $f_a$ and second frequency $f_s$ varies in a temporally limited manner. This may for example be caused by a jitter, i.e. a fluctuation, of the first frequency $f_a$ or the second frequency $f_s$.

FIG. 3 illustrates the step of generating a second total increment according to a first embodiment of the method as a flowchart. After starting the method, which sets the index k to zero, in step S21 at first the first total increment $v_0(k)$ and the first value W(k) are requested from the first unit, and, if the first value W(k) does not correspond directly to the time increment $t_0(k)$ belonging to the first total increment, the time increment $t_0(k)$ belonging to the first total increment $v_0(k)$ will be calculated from W(k).

Then, in step S22 it is decided, whether the index k equals zero or not. If k=0 holds, in step S23 the following initial values for generating the second total increment v(k) are set:

$$t_0(0)=t_s \qquad (1),$$

$$t_1(0)=t_s \qquad (2),$$

$$t_{1r}(0)=0 \qquad (3),$$

$$v_1(0)=0 \qquad (4) \text{ and}$$

$$v_r(0)=0 \qquad (5).$$

In the next step S24 the second total increment is calculated as follows:

$$v(k) = v_1(k) \cdot \frac{t_{1r}(k)}{t_1(k)} + v_0(k) \cdot \frac{t_s - t_{1r}(k)}{t_0(k)} - v_r(k). \qquad (6)$$

Here, the first summand represents a possibly non-processed residual part from the previous integration interval, the second summand the largest or the complete part from the present integration interval as well as possibly an extrapolated estimation for the yet unknown next integration interval and the last summand or the subtrahend a correction increment that takes into account an extrapolated estimation for the present integration interval that has been used possibly in the previous step for generating a second total increment. Hence, the second total increment corresponds to the sum of possibly an in the previous step for generating a second total increment non-processed residual part, of at least a part of the first total increment requested in the present step for requesting a first total increment, of possibly a part of the present total increment extrapolated into the next step, and of possibly a correction increment that corresponds to the negative of the extrapolated part used in the previous step for generating the second total increment.

To explain this in more detail a case-by-case analysis regarding the length of the nominal time increment $t_s$ with respect to the sum of the residual part $t_{1r}(k)$ of the time increment belonging to the previous first total increment that has not been processed in the previous step for generating a second total increment and of the time increment $t_0(k)$ of the presently requested first total increment is carried out.

If $t_{1r}(k)+t_0(k)<t_s$, an extrapolation of the first total increment $v_0(k)$ to the next requested first total increment will be carried out. This extrapolation is based on the assumption that the next first total increment to be requested has the same value as the presently requested first total increment. By means of this extrapolation the time increment $t_0(k)$ belonging to the presently requested first total increment is elongated up to the end of the nominal time increment $t_s$ such that in the end $t_{1r}(k)+t_0'(k)=t_s$, wherein $t_0'(k)$ is the elongated time increment $t_0(k)$.

The extrapolated part of the second total increment corresponds to the correction increment of the next step for generating a second total increment. As the whole time increment $t_0(k)$ belonging to the present first total increment contributes to the generation of the second total increment v(k), in the next step of generating a second total increment no non-processed residual part of the presently requested first total increment appears.

If $t_{1r}(k)+t_0(k) \geq t_s$, an interpolation of the first total increment $v_0(k)$ will be carried out. By means of this interpolation the time increment $t_0(k)$ belonging to the presently requested first total increment is shortened to the end of the nominal time increment $t_s$ such that in the end $t_{1r}(k)+t_0'(k)=t_s$, wherein $t_0'(k)$ is the shortened time increment $t_0(k)$.

Hence, in the next step of generating a second total increment a yet non-processed residual part of the presently requested first total increment appears. As there is no extrapolated part of the second total increment, there is no need to subtract in the next step of generating a second total increment a correction increment.

As explained the residual part $t_{1r}(k)$ used in the next step of generating a second total increment and the correction increment $v_r(k)$ used in the next step of generating a second total increment are different in the two discussed cases. Hence, after or before the calculation of the second total increment v(k) a case-by-case analysis regarding the length of the nominal time increment $t_s$ as described above is carried out in step S25. Depending therefrom in step S26 or S27 the state transitions, i.e. the values of $v_r(k+1)$ and $t_{1r}(k+1)$ to be used in the next step of generating a second total increment, are determined as follows:

If $t_{1r}(k) + t_0(k) < t_s$: (7)

$$v_r(k+1) = v_0(k) \cdot \frac{t_s - t_{1r}(k) - t_0(k)}{t_0(k)}$$

and $$t_{1r}(k+1) = 0, \qquad (8)$$

if $t_{1r}(k) + t_0(k) \geq t_s$:

$$v_r(k+1) = 0 \qquad (9)$$

and $$t_{1r}(k+1) = t_0(k) + t_{1r}(k) - t_s. \qquad (10)$$

In each of the cases in step S28 the two following state transitions, i.e. the values of $t_1(k+1)$ and $v_1(k+1)$ used in the next step for generating a second total increment, are determined as follows:

$$t_1(k+1)=t_0(k) \qquad (11) \text{ and}$$

$$v_1(k+1)=v_0(k) \qquad (12).$$

As long as the method according to the present invention is not ended the index k will then be increased in step S29 by 1 and the steps S21 to S29 are repeated, wherein the whole process is carried out with the second frequency $f_s$, i.e. once per request cycle.

Simulations of the method illustrated in FIG. 3 that uses real sensor data as partial increments had as result that after a transient oscillation of the method the second total increment satisfied the integral error criterion also for jitter effected frequencies $f_s$ and $f_a$ and that the differential error criterion was considerably improved with respect to the first total increment. Deviations of the second total increment from an expected value that were caused by the extrapolations used in the method were smaller than the sensor noise.

Figure 4:
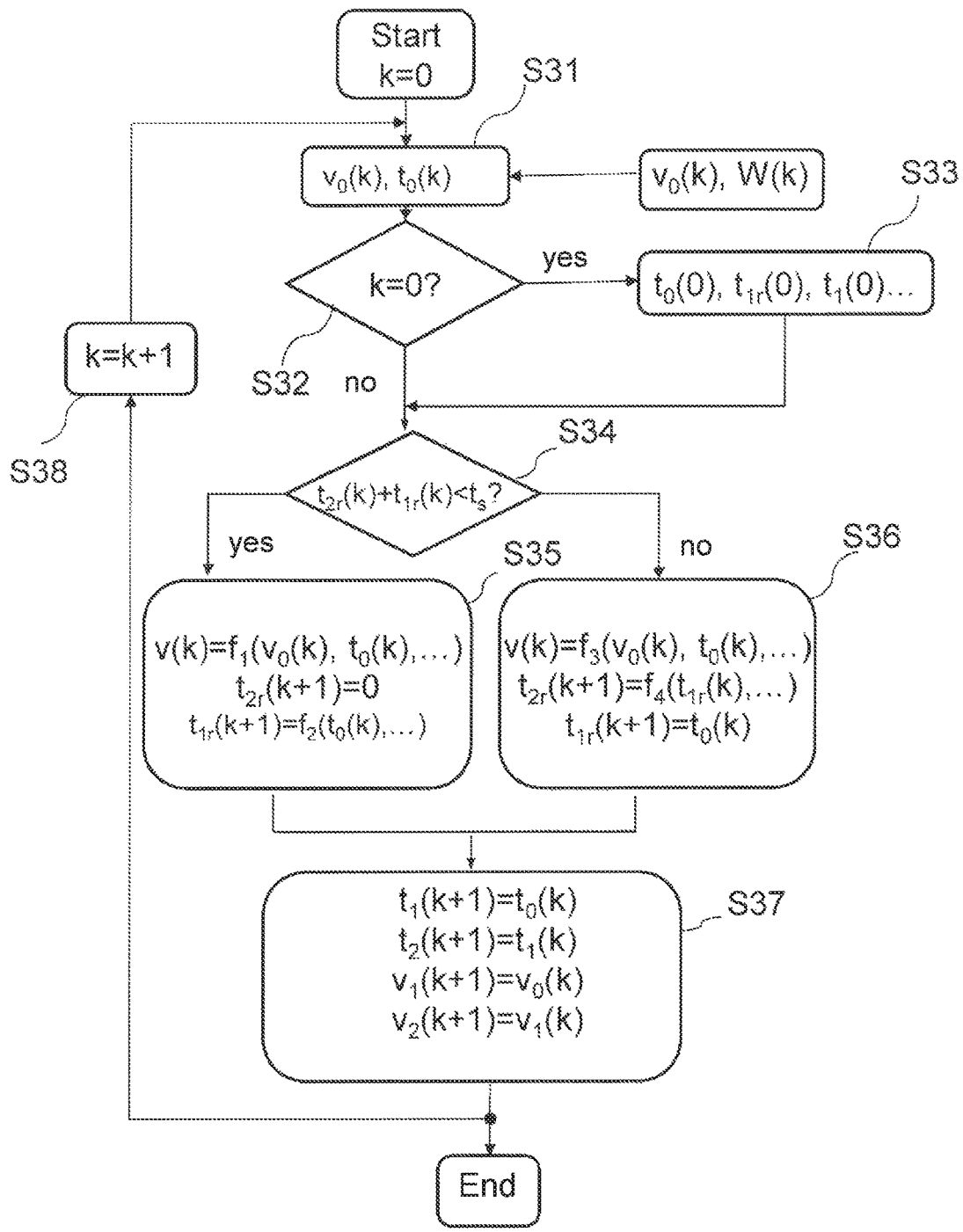
FIG. 4 shows a second embodiment of the step of generating the second total increment, in which a retardation by one request cycle between the request of a first total increment and transmitting of the second total increment generated therefrom occurs.

FIG. 4 illustrates the step for generating a second total increment according to a second embodiment of the method as flowchart. After starting the method and setting the index k to zero, in step S31 at first the first total increment $v_0(k)$ and the first value W(k) are requested from the first unit and, if the first value W(k) does not correspond directly to the time increment $t_0(k)$ belonging to the first total increment, the time increment $t_0(k)$ belonging to the first total increment $v_0(k)$ is calculated from W(k).

Then, in step S32 it is decided, whether the index k equals zero or not. If k=0, the following initial values for generating the second total increment v(k) are set in step S33:

$$t_0(0) = t_s \quad (13),$$

$$t_1(0) = t_s \quad (14),$$

$$t_2(0) = t_s \quad (15),$$

$$t_{1r}(0) = t_s \quad (16),$$

$$t_{2r}(0) = 0 \quad (17),$$

$$v_1(0) = 0 \quad (18)$$

and $$v_2(0) = 0 \quad (19).$$

In the next step S34 a case-by-case analysis depending on the length of the nominal time increment $t_s$ with respect to the sum of the residual part $t_{2r}(k)$ of the time increment belonging to the first total increment previous to the previous first total increment that has not been processed in the previous steps for generating a second total increment and the residual part $t_{1r}(k)$ of the time increment belonging to the previous first total increment that has not been processed in the previous step of generating a second total increment are carried out.

If $t_{2r}(k)+t_{1r}(k)<t_s$, the second total increment will be calculated in step S35 as follows:

$$v(k) = v_2(k) \cdot \frac{t_{2r}(k)}{t_2(k)} + v_1(k) \cdot \frac{t_{1r}(k)}{t_1(k)} + v_0(k) \cdot \frac{t_s - t_{1r}(k) - t_{2r}(k)}{t_0(k)}. \quad (20)$$

Hence, the second total increment is a combination of possibly the yet non-processed residual part of the first total increment previous to the previous first total increment, i.e. from the integration interval previous to the previous integration interval, of the complete yet non-processed residual part of the previous first total increment, i.e. from the previous integration interval, as well as a part of the present first total increment from the present integration interval. As the whole residual part of the previous first total increment contributes to the second total increment, there is no residual part of the previous first total increment that needs to be taken into account in the next step for generating a second total increment. From the present first total increment a part contributes already to the second total increment such that in the next step for generating a second total increment only a residual part of this first total increment needs to be taken into account. Hence, the following state transitions result for the next step of generating a second total increment, which are also calculated in step S35:

$$t_{2r}(k+1) = 0 \quad (21) \text{ and}$$

$$t_{1r}(k+1) = t_0(k) - (t_s - t_{2r}(k) - t_{1r}(k)) \quad (22).$$

If $t_{2r}(k)+t_{1r}(k) \geq t_s$, the second total increment will be calculated in step S36 as follows:

$$v(k) = v_2(k) \cdot \frac{t_{2r}(k)}{t_2(k)} + v_1(k) \cdot \frac{t_s - t_{2r}(k)}{t_1(k)}. \quad (23)$$

Hence, the second total increment is a combination of possible the yet non-processed residual part of the first total increment previous to the previous first total increment, i.e. from the integration interval previous to the previous integration interval, as well as of the largest part of the previous first total increment, i.e. from the previous integration interval. As only a part of the previous first total increment contributes to the second total increment, a residual part of the previous part of the first total increment remains, which has to be taken into account in the next step of generating a second total increment. From the present first total increment no part contributes yet to the second total increment such that in the next step for generating a second total increment the complete part of the present first total increment needs to be taken into account. Hence, the following state transitions result for the next step of generating a second total increment, which are also calculated in step S36.

$$t_{2r}(k+1) = t_{1r}(k) + t_{2r}(k) - t_s \quad (24)$$

and $$t_{1r}(k+1) = t_0(k) \quad (25).$$

In general, the second total increment is the sum of possibly a residual part of a first total increment previous to the previous first total increment requested in a step previous to the previous step for requesting a first total increment that has yet not been processed in a step previous to the previous step for generating a second total increment, of at least a part of the previous total increment requested in the previous step for requesting a first total increment, as well as of possibly a part of the first total increment requested in the present step of requesting a first total increment. Therefore, a retardation of one request cycle occurs between the step of requesting a first total increment from the first unit and the step of transmitting of a second total increment corresponding to the requested first total increment.

In each case in step S37 the following state transitions, i.e. the values to be used in the next steps for generating a second total increment, are determined:

$$t_1(k+1) = t_0(k) \quad (26),$$

$$t_2(k+1) = t_1(k) \quad (27),$$

$$v_1(k+1) = v_0(k) \quad (28)$$

and $$v_2(k+1) = v_1(k) \quad (29).$$

As long as the method according to the present invention is not ended in step S38 the index k is now increased by 1 and the steps S31 to S38 are repeated, wherein the whole process is carried out with the second frequency $f_s$, i.e. once per request cycle.

Simulations of the method illustrated in FIG. 4 that use real sensor data as partial increments had as result that after a transient oscillation of the method the second total increment satisfied the integral error criterion as well as the differential error criterion also for jitter effected frequencies $f_s$ and $f_a$.

Therefore, the method as illustrated in FIG. 4 is more robust with respect to a jitter in the first frequency $f_a$ or the second frequency $f_s$ than the method as illustrated in FIG. 3. However, there is a retardation of one request cycle $1/f_s$ between the first total increment and the second total increment corresponding to the first total increment, i.e. that second total increment, in which the first total increment is comprised at least partially. Hence, the method illustrated in FIG. 4 is particularly suitable for methods for transmitting of data for which such a retardation is not important or in which such a retardation can be taken into account by further processing the data.

Figure 5:
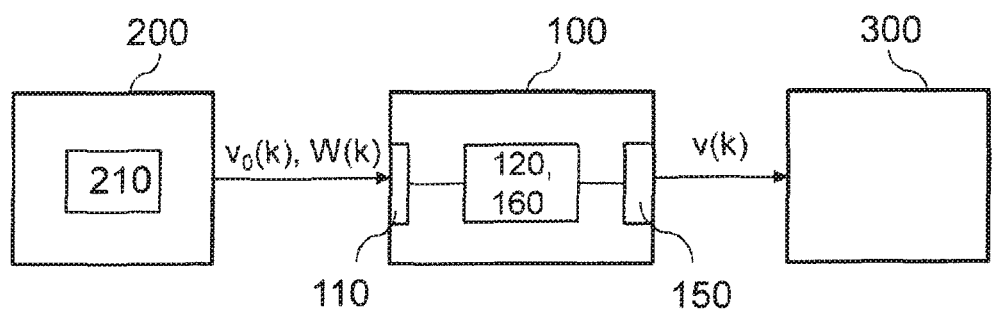
FIG. 5 shows the device according to the invention as well as the first unit and the second unit in an exemplary form.

FIG. 5 illustrates a device 100, which is suitable to carry out the method described in FIG. 2, as well as a first unit 200 and a second unit 300 in a schematic form.

The first unit 200 comprises an accumulator 210, which accumulates data or partial increments that are generated or captured with a first frequency $f_a$, and which provides a first total increment $v_0(k)$ as well as a first value $W(k)$, which represents the time increment $t_0(k)$, i.e. the accumulation interval, belonging to the first total increment. The first unit 200 may for example be a sensor, which generates the data or partial increments with the first frequency $f_a$, i.e. the data path clock, and may comprise in this case further units, for example measurement units and/or processing units. Examples for such a sensor are among others rotation rate or acceleration sensors. In rotation rate sensors the partial increments represent partial angle increments, while in acceleration sensors the partial increments are partial velocity increments. Alternatively, the first unit 200 may request the data or partial increments also from a further unit and accumulate them in the accumulator 210 with the first frequency $f_a$.

The device 100 according to the present invention comprises an input 110 that is suitable to request or receive the first total increment $v_0(k)$ and the first value $W(k)$ from the first unit 200 with a second frequency $f_s$, a filter 120 or 160 that is suitable to generate from the first total increment $v_0(k)$ a second total increment $v(k)$ by using the first value $W(k)$, and an output 150 that is suitable to transmit the second total increment $v(k)$ to the second unit 300 with the second frequency $f_s$.

The second unit 300 may be an evaluation and display unit or an arbitrary type of further processing unit that requests or receives the second total increment transmitted by the device 100 with the second frequency $f_s$ and evaluates, displays, and/or further processes it accordingly.

The device 100 allows synchronizing of data generated with the first frequency $f_a$ to the second frequency $f_s$. Due to this, the data generated with the first frequency $f_a$ can be represented exactly in a request cycle of the second frequency $f_s$. In particular, the device 100 allows satisfying the integral error criterion and improving the differential error criterion for first and second frequencies $f_a$ and $f_s$ mutually independent of each other.

The device 100 is illustrated in FIG. 5 as separate unit that is arranged between the first unit 200 and the second unit 300. It is, however, also possible that the device 100 is integrated into the first unit 200 or into the second unit 300. Then, the input 110 or the output 150 can be omitted accordingly.

Figure 6:
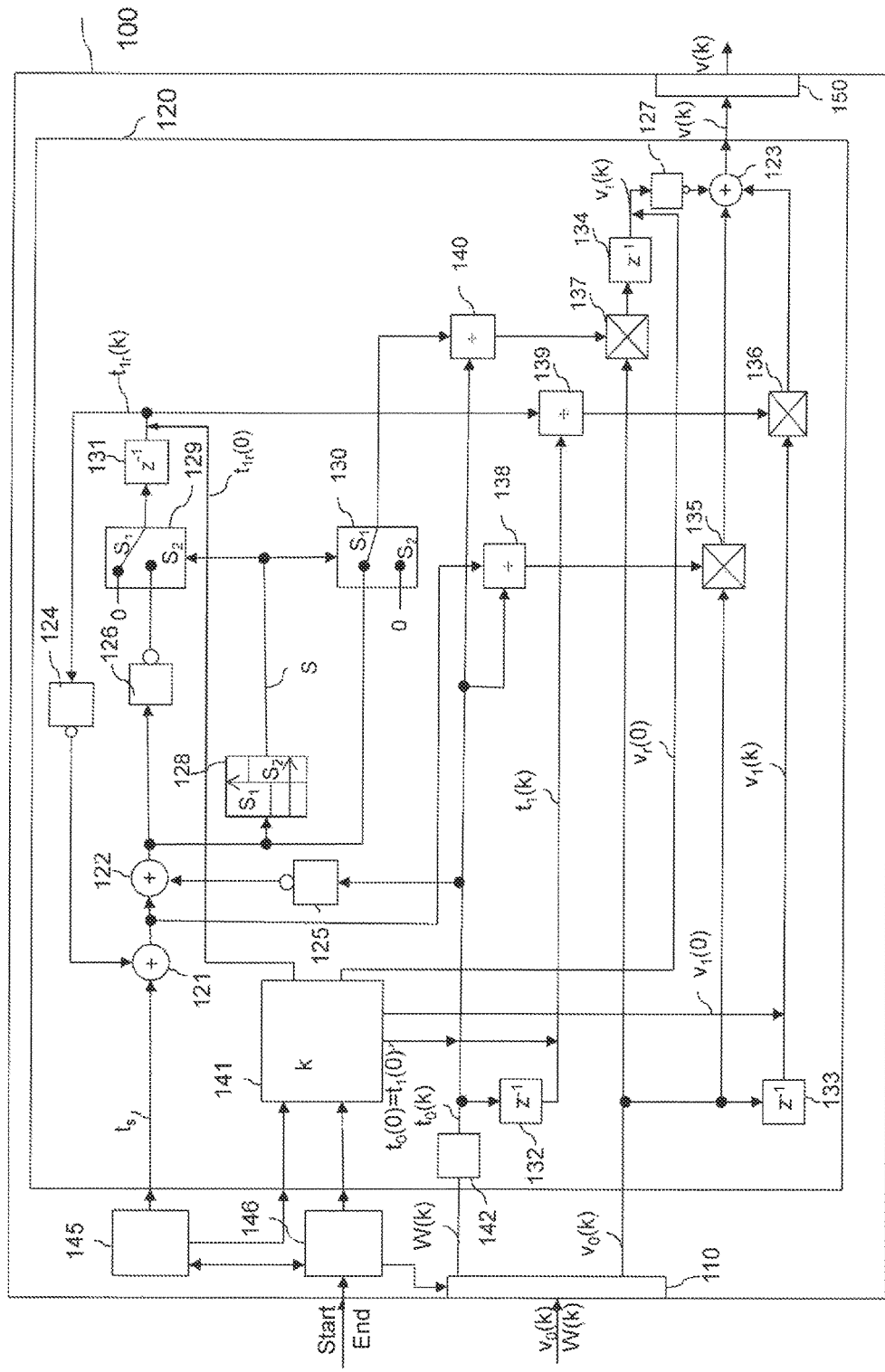
FIG. 6 shows a first embodiment of the device according to the invention, which is suitable for carrying out the first embodiment of the method according to the present invention.

FIG. 6 illustrates a first embodiment of the device 100 according to the present invention that is suitable to carry out the first embodiment of the method according to the present invention described with respect to FIG. 3.

Besides the already mentioned input 110 and output 150 this embodiment comprises a filter 120, a storage 145, and a clock generator 146. The clock generator 146 is configured to receive a start or end signal from outside of the device 100 and controls then with the second frequency $f_s$ the request of the first total increment $v_0(k)$ and the first value $W(k)$ from the first unit 200 as well as the setting of the index k. The start or end signal may be provided by the first unit 200, the second unit 300 or by any other device or a user.

In the storage 145 the initial values for the parameters necessary for calculating the second total increment $v(k)$ in the filter 120 are stored and are provided after receiving the start signal to the filter 120. Moreover, the second frequency $f_s$ may be stored in the storage 145. The second frequency $f_s$ or the nominal time increment $t_s$ resulting therefrom may, however, also be provided directly from the second unit 300 or may be determined from a signal sent from the second unit 300. The initial values as well as the nominal time increment are provided to the filter 120 from storage 145 and/or from outside.

The filter comprises a counter 141, which provides the present value of the index k. After receiving a start signal from the clock generator 146 the index k is set to zero in the counter 141 and is increased by 1 in each cycle set by the clock generator 146. If the value of the index k equals zero, the counter 141 will provide the initial values, i.e. $t_{1r}(0)$, $t_0(0)$, $t_1(0)$, $v_1(0)$ and $v_r(0)$, to the respective components of the filter, which will be described in the following in detail.

It is possible that functionalities of different components of the device 100, for example of the storage 145, the clock generator 146 and/or of the counter 141 are realized in one or several components together. Further, it is also possible that the cycle for requesting the first total increment and the first value as well as for increasing the index k is supplied from outside, i.e. from outside of the device 100, such that the device 100 does not need to comprise a clock generator.

The filter comprises a calculation unit 142 that is suitable to calculate from the requested first value $W(k)$ the time increment $t_0(k)$ belonging to the first total increment $v_0(k)$. If the first value $W(k)$ corresponds already to the time increment $t_0(k)$, the calculation unit 142 may also be omitted.

For calculating the second total increment $v(k)$ as well as the state transitions $t_1(k+1)$, $v_1(k+1)$, $v_r(k+1)$ and $t_{1r}(k+1)$ the filter 120 comprises further adders 121 to 123, inverters 124 to 127, a two position element 128, switching elements 129 and 130, retardation units 131 to 134, multipliers 135 to 137, as well as dividers 138 to 140. The two position element 128 provides a signal S on its output and allows carrying out the case-by-case analysis depending on the length of the nominal time increment $t_s$ with respect to the sum of $t_{1r}(k)$ and $t_0(k)$. If $t_{1r}(k)+t_0(k)<t_s$, the signal S will take the value $S_1$, while if $t_{1r}(k)+t_0(k) \geq t_s$, the signal S will take the value $S_2$. The switching elements 129 and 130 have switching positions according to the respective signal S such that the output of the switching elements takes a value corresponding to the respective case. The retardation units 131 to 134 represent temporary storages, which forward an input value with a time retardation of 1 cycle of the integration interval, i.e. with a time retardation of $t_s$, to the output. Thus, the input value of a retardation unit can be supplied in the next integration interval for further processing.

The exact connection of the single components of the filter 120 can be deduced from FIG. 6. This allows the filter 120 to carry out the calculations of the second total increment $v(k)$ as well as of the state transitions $t_1(k+1)$, $v_1(k+1)$, $v_r(k+1)$ and $t_{1r}(k+1)$ according to equations (6), (7) and (8) or (9) and (10) as well as (11) and (12).

Figure 7:
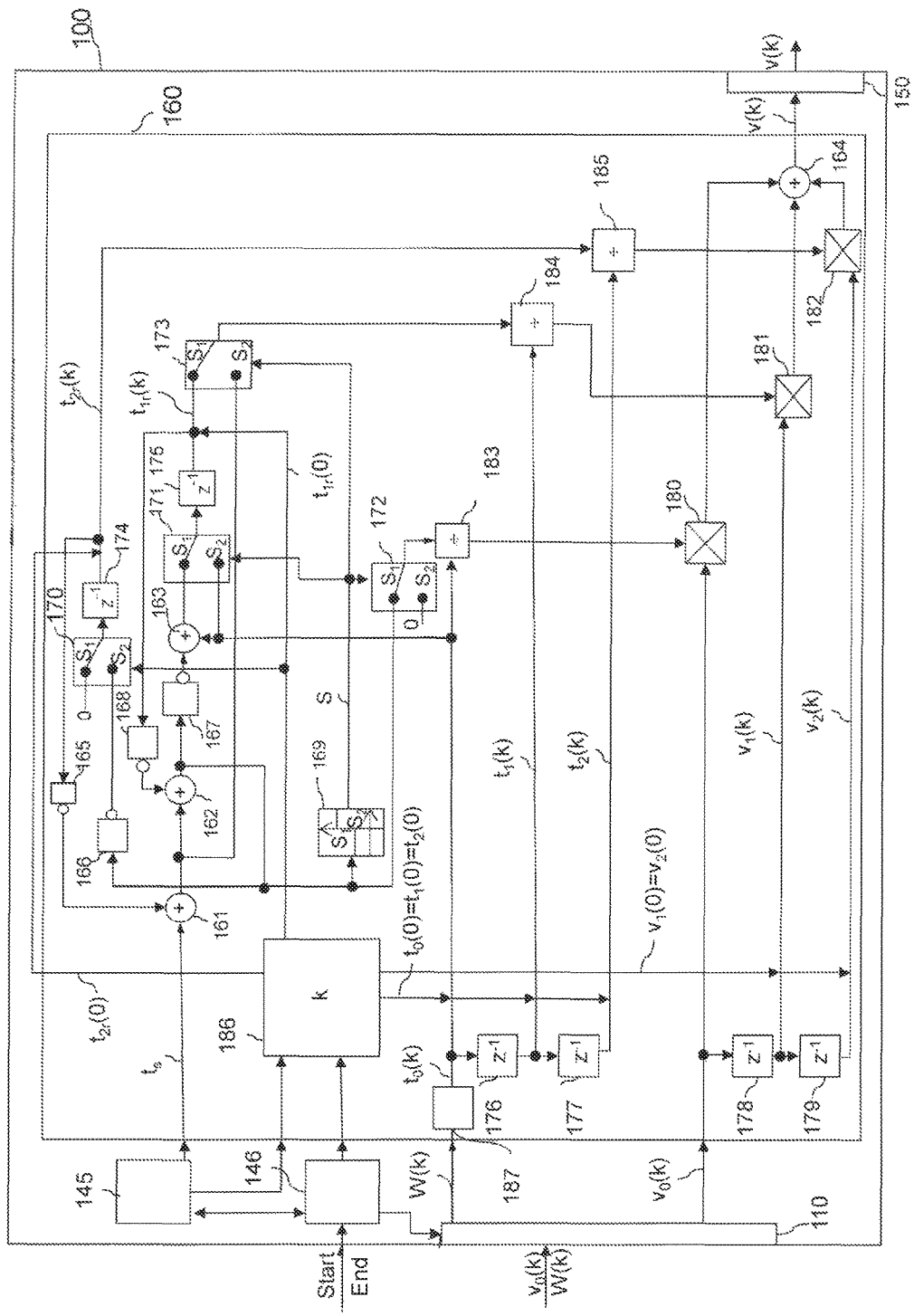
FIG. 7 shows a second embodiment of the device according to the present invention, which is configured to carry out the second embodiment of the method according to the present invention.

FIG. 7 illustrates a first embodiment of the device 100 according to the present invention that is suitable to carry out the second embodiment of the method according to the present invention described with respect to FIG. 4.

Besides the already mentioned input 110 and output 150 this embodiment comprises a filter 160, a storage 145 and a clock generator 146. Regarding the storage 145 and the clock generator 146 the statements made with respect to FIG. 6 do also apply.

The filter comprises a counter 186 which provides the present value of the index k. After receiving a start signal from the clock generator 146 the index k is set to zero in the counter 186 and is increased by 1 in each further cycle provided by the clock generator 146. If the value of the index k equals zero, the counter 186 provides the initial values, i.e. $t_{2r}(0)$, $t_{1r}(0)$, $t_0(0)$, $t_2(0)$, $t_1(0)$, $v_1(0)$ and $v_2(0)$, to the respective components of the filter, which will be described in what follows in more detail.

It is possible that functionalities of different components of the device 100, for example of the storage 145, the clock generator 146 and/or the counter 186 are realized together in one or several components or that the clock generator 146 may be omitted as described with respect to FIG. 6.

Similarly, as described with respect to FIG. 6, the filter 160 may comprise a calculation unit 187 that is suitable to calculate from the requested first value W(k) the time increment $t_0(k)$ belonging to the first total increment $v_0(k)$. If the first value W(k) corresponds already to the time increment $t_0(k)$, the calculation unit 187 may also be omitted.

Further, the filter 160 comprises adders 161 to 164, inverters 165 to 168, a two position element 169, switching elements 170 and 173, retardation units 174 to 179, multipliers 180 to 182, as well as dividers 183 to 185 for calculating the second total increment v(k) as well as the state transitions $t_1(k+1)$, $t_2(k+1)$, $v_1(k+1)$, $v_2(k+1)$, $t_{1r}(k+1)$ and $t_{2r}(k+1)$. The two position element 169 provides a signal S at its output and allows carrying out the case-by-case analysis depending on the length of the nominal time increment $t_s$ in comparison to the sum of $t_{1r}(k)$ and $t_{2r}(k)$. If, $t_{1r}(k)+t_{2r}(k)<t_s$ the signal S will take the value $S_1$, while if $t_{1r}(k)+t_{2r}(k)\geq t_s$, the signal S will take the value $S_2$. The switching elements 170 and 173 take a switch positions according to the respective signal S such that the output of the switching elements has a value according to the corresponding case. The retardation units 174 to 179 represent temporary storages, which forward an input value with a time retardation of 1 cycle of the integration interval, i.e. with a time retardation of $t_s$, to the output. Hence, the input value of a retardation unit is present in the next integration interval at the output for further processing.

The exact connection of the single components of the filter 160 can be deduced from FIG. 7. The filter 160 allows calculating the second total increment v(k) as well as the state transitions $t_1(k+1)$, $t_2(k+1)$, $v_1(k+1)$, $v_2(k+1)$, $t_{1r}(k+1)$ and $t_{2r}(k+1)$ according to equations (20) or (23), (21), and (22) or (24), and (25) as well as (26) to (29).

The invention claimed is:

1. A method for transmitting data between a first unit which accumulates data that has been generated with a first frequency ($f_a$) and a second unit which requests the accumulated data with a second frequency ($f_s$), which is smaller than the first frequency ($f_a$), the method comprising:

requesting a first total increment ($v_0(k)$) and a first value (W(k)), which represents a time increment ($t_0(k)$) belonging to the first total increment ($v_0(k)$), from the first unit, wherein the first total increment ($v_0(k)$) is the data content of the accumulated data block provided at the requested time (k) in the first unit;

generating of a second total increment (v(k)) from the first total increment ($v_0(k)$) using the first value (W(k)), wherein the second total increment (v(k)) is the data content of a data block adapted to a nominal time increment ($t_s$) of the second frequency ($f_s$), wherein the second total increment (v(k)) is generated based on at least a previous first total increment ($v_1(k)$) requested in the previous step of requesting the first total increment ($v_0(k)$), a time increment ($t_1(k)$) belonging to the previous first total increment ($v_1(k)$), and a residual part ($t_{1r}(k)$) of the time increment ($t_1(k)$) belonging to the previous first total increment ($v_1(k)$) that has not yet been processed in the previous step of generating the second total increment v(k); and transmitting the second total increment (v(k)) to the second unit.

2. The method according to claim 1, characterized in that:

the steps of requesting a first total increment ($v_0(k)$) and of a first value (W(k)), of generating a second total increment (v(k)), and of transmitting the second total increment (v(k)) are carried out repeatedly with the second frequency ($f_s$).

3. The method according to claim 2, characterized in that:

the second total increment (v(k)) is calculated as follows:

$$v(k) = v_1(k) \cdot \frac{t_{1r}(k)}{t_1(k)} + v_0(k) \cdot \frac{t_s - t_{1r}(k)}{t_0(k)} - v_r(k),$$

wherein $t_s$ is the nominal time increment belonging to the second frequency ($f_s$), $t_0(k)$ is the time increment belonging to the first total increment requested in the present step of requesting the first total increment, and $v_r(k)$ is the extrapolated part used in the previous step of generating the second total increment that has to be subtracted in the present step of generating the second total increment.

4. The method according to claim 3, characterized in that:

for k=0 the following initial conditions are set:

$t_0(0) = t_s,$ $t_1(0) = t_s,$ $t_{1r}(0) = 0,$ $v_1(0) = 0$ and $v_r(0) = 0.$

5. The method according to claim 3, characterized in that:

the values of $t_1(k+1)$, $v_1(k+1)$, $t_{1r}(k+1)$ and $v_r(k+1)$ to be used in the next step of generating the second total increment (v(k)) are calculated as follows:

$t_1(k+1) = t_0(k),$ $v_1(k+1) = v_0(k),$ and if $t_{1r}(k) + t_0(k) < t_s:$ $v_r(k+1) = v_0(k) \cdot \dfrac{t_s - t_{1r}(k) - t_0(k)}{t_0(k)}$ and $t_{1r}(k+1) = 0,$ if $t_{1r}(k) + t_0(k) \geq t_s:$ $v_r(k+1) = 0$ and $t_{1r}(k+1) = t_0(k) + t_{1r}(k) - t_s.$ 6. The method according to claim 2,
characterized in that:
the second total increment (v(k)) is calculated as follows:

if $t_{2r}(k) + t_{1r}(k) < t_s:$ $v(k) = v_2(k) \cdot \dfrac{t_{2r}(k)}{t_2(k)} + v_1(k) \cdot \dfrac{t_{1r}(k)}{t_1(k)} + v_0(k) \cdot \dfrac{t_s - t_{1r}(k) - t_{2r}(k)}{t_0(k)},$ if $t_{2r}(k) + t_{1r}(k) \geq t_s:$ $v(k) = v_2(k) \cdot \dfrac{t_{2r}(k)}{t_2(k)} + v_1(k) \cdot \dfrac{t_s - t_{2r}(k)}{t_1(k)},$ wherein
 - $v_2(k)$ is the first total increment previous to the previous first total increment that is requested in the step previous to the previous step of requesting a first total increment,
 - $t_2(k)$ is the time increment belonging to the first total increment previous to the previous first total increment,
 - $t_{2r}(k)$ is the residual part of the time increment $t_2(k)$ belonging to the first total increment previous to the previous first total increment that has not yet been processed in the previous steps of generating a second total increment,
 - $t_s$ is the nominal time increment belonging to the second frequency ($f_s$), and
 - $t_0(k)$ is the time increment belonging to the first total increment requested in the present step of requesting the first total increment.

7. The method according to claim 6,
characterized in that:
for k=0 the following initial conditions are set:

$t_0(0)=t_s,$ $t_1(0)=t_s,$ $t_2(0)=t_s,$ $t_{1r}(0)=t_s,$ $t_{2r}(0)=0,$ $v_1(0)=0$ and $v_2(0)=0.$ 8. The method according to claim 6,
characterized in that:
the values of $t_1(k+1)$, $t_2(k+1)$, $v_1(k+1)$, $v_2(k+1)$, $t_{1r}(k+1)$ and $t_{2r}(k+1)$ to be used in the next step of generating the second total increment (v(k)) are calculated as follows:

$t_1(k+1)=t_0(k),$ $t_2(k+1)=t_1(k),$ $v_1(k+1)=v_0(k),$ $v_2(k+1)=v_1(k),$ and if $t_{2r}(k)+t_{1r}(k)<t_s:$ $t_{1r}(k+1)=t_0(k)-(t_s-t_{2r}(k)-t_{1r}(k))$ and $t_{2r}(k+1)=0,$ if $t_{2r}(k)+t_{1r}(k) \geq t_s:$ $t_{1r}(k+1)=t_0(k)$ and $t_{2r}(k+1)=t_{1r}(k)+t_{2r}(k)-t_s.$ 9. A device for transmitting data between a first unit, which accumulates data that are generated with a first frequency ($f_a$), and as second unit, which requests the accumulated data with a second frequency ($f_s$), which is smaller than the first frequency ($f_a$), the device comprising:
 - an input that is suitable to request a first total increment ($v_0(k)$) and a first value (W(k)), which represents a time increment ($t_0(k)$) belonging to the first total increment ($v_0(k)$), from the first unit with the second frequency ($f_s$), wherein the first total increment ($v_0(k)$) is the data content of an accumulated data block provided at the requested time in the first unit;
 - a filter that is configured to generate from the first total increment ($v_0(k)$) and the first value (W(k)) a second total increment (v(k)), wherein the second total increment (v(k)) is the data content of a data block adapted to a nominal time increment ($t_s$) of the second frequency ($f_s$) and the second total increment (v(k)) is generated based on at least a previous first total increment ($v_1(k)$) requested in the previous step of requesting the first total increment ($v_0(k)$), a time increment ($t_1(k)$) belonging to the previous first total increment ($v_1(k)$), and a residual part ($t_{1r}(k)$) of the time increment ($t_1(k)$) belonging to the previous first total increment ($v_1(k)$) that has not yet been processed in the previous step of generating the second total increment v(k); and
 - an output that is configured to transmit the second total increment (v(k)) to the second unit with the second frequency ($f_s$).

10. The device according to claim 9,
characterized in that:
the filter is configured to calculate the second total increment (v(k)) as follows:

$$v(k) = v_1(k) \cdot \frac{t_{1r}(k)}{t_1(k)} + v_0(k) \cdot \frac{t_s - t_{1r}(k)}{t_0(k)} - v_r(k),$$

wherein
- $t_s$ is the nominal time increment belonging to the second frequency ($f_s$),
- $t_0(k)$ is the time increment belonging to the first total increment requested in the present request cycle of the second frequency ($f_s$), and
- $v_r(k)$ is the extrapolated part used in the previous step of generating the second total increment that has to be subtracted in the present step of generating the second total increment.

11. The device according to claim 10,
characterized in that:
the filter comprises an initial value setting unit that is configured to set for k=0 the following initial conditions:

$t_0(0) = t_s$, $t_1(0) = t_s$, $t_{1r}(0) = 0$, $v_1(0) = 0$ and $v_r(0) = 0$.

12. The device according to claim 10,
characterized in that:
the filter is configured to calculate the values of $t_1(k+1)$, $v_1(k+1)$, $t_{1r}(k+1)$ and $v_r(k+1)$ to be used in the next generating of a second total increment (v(k+1)) as follows:

$$t_1(k+1) = t_0(k),$$

$$v_1(k+1) = v_0(k),$$

and if $t_{1r}(k) + t_0(k) < t_s$:

$$v_r(k+1) = v_0(k) \cdot \frac{t_s - t_{1r}(k) - t_0(k)}{t_0(k)}$$

and $t_{1r}(k+1) = 0,$ if $t_{1r}(k) + t_0(k) \geq t_s$:

$v_r(k+1) = 0$ and $t_{1r}(k+1) = 0$ and $t_{1r}(k+1) = t_0(k) + t_{1r}(k) - t_s.$ 13. The device according to claim 9,
characterized in that:
the filter is configured to calculate the second total increment (v(k)) as follows:

if $t_{2r}(k) + t_{1r}(k) < t_s$:

$$v(k) = v_2(k) \cdot \frac{t_{2r}(k)}{t_2(k)} + v_1(k) \cdot \frac{t_{1r}(k)}{t_1(k)} + v_0(k) \cdot \frac{t_s - t_{1r}(k) - t_{2r}(k)}{t_0(k)},$$

if $t_{2r}(k) + t_{1r}(k) \geq t_s$:

$$v(k) = v_2(k) \cdot \frac{t_{2r}(k)}{t_2(k)} + v_1(k) \cdot \frac{t_s - t_{2r}(k)}{t_1(k)},$$

wherein
- $v_2(k)$ is the first total increment previous to the previous first total increment requested in the request cycle previous to the previous request cycle of the second frequency ($f_s$),
- $t_2(k)$ is the time increment belonging to the first total increment previous to the previous first total increment,
- $t_{2r}(k)$ is the residual part of the time increment $t_2(k)$ belonging to the first total increment previous to the previous first total increment that has not yet been processed in the previous steps of generating a second total increment,
- $t_s$ is the nominal time increment belonging to the second frequency ($f_s$), and
- $t_0(k)$ is the time increment belonging to the first total increment requested in the present request cycle of the second frequency ($f_s$).

14. The device according to claim 13,
characterized in that:
the filter comprises an initial value setting unit that is configured to set for k=0 the following initial conditions:

$t_0(0) = t_s$, $t_1(0) = t_s$, $t_2(0) = t_s$, $t_{1r}(0) = t_s$, $t_{2r}(0) = 0$, $v_1(0) = 0$ and $v_2(0) = 0$.

15. The device according to claim 13,
characterized in that:
the filter is configured to calculate the values of $t_1(k+1)$, $t_2(k+1)$, $v_1(k+1)$, $v_2(k+1)$, $t_{1r}(k+1)$ and $t_{2r}(k+1)$ to be used in the next step of generating a second total increment (v(k+1)) as follows:

$t_1(k+1) = t_0(k),$ $t_2(k+1) = t_1(k),$ $v_1(k+1) = v_0(k),$ $v_2(k+1) = v_1(k),$ and if $t_{2r}(k) + t_{1r}(k) < t_s$:

$t_{1r}(k+1) = t_0(k) - (t_s - t_{2r}(k) - t_{1r}(k))$ and $t_{2r}(k+1) = 0$, if $t_{2r}(k) + t_{1r}(k) \geq t_s$:

$t_{1r}(k+1) = t_0(k)$ and $t_{2r}(k+1) = t_{1r}(k) + t_{2r}(k) - t_s$.

\* \* \* \* \*